United States Patent [19]

Denhard, Jr. et al.

[11] E Re. 28,772

[45] Reissued Apr. 13, 1976

[54] HIGH STRENGTH CORROSION-RESISTANT STAINLESS STEEL

[75] Inventors: Elbert E. Denhard, Jr., Towson, Md.; D. Cameron Perry, Middletown, Ohio; Robert R. Gaugh, Lutherville, Md.

[73] Assignee: Armco Steel Corporation, Middletown, Ohio

[22] Filed: Mar. 8, 1974

[21] Appl. No.: 449,516

Related U.S. Patent Documents

Reissue of:

[64] Patent No.: 3,592,634
Issued: July 13, 1971
Appl. No.: 725,516
Filed: Apr. 30, 1968

[52] U.S. Cl. ..... 75/128 A; 75/128 G; 75/128 N; 75/128 V; 75/128 W

[51] Int. Cl.[2]...C22C 38/44; C22C 38/46; C22C 38/58

[58] Field of Search ..... 75/128 A, 128 G, 128 V, 75/128 W, 128 N

[56] References Cited

UNITED STATES PATENTS

| | | | |
|---|---|---|---|
| 2,229,065 | 1/1941 | Franks | 75/128.5 |
| 2,405,666 | 8/1946 | Norwood | 75/128.85 |
| 2,671,726 | 3/1954 | Jennings | 75/128 A |
| 2,696,433 | 12/1954 | Tanczyn | 75/128 A |
| 3,118,761 | 1/1964 | Hull | 75/128 A |
| 3,152,934 | 10/1964 | Lula | 75/128.85 |
| 3,235,378 | 2/1966 | Jennings | 75/128.5 |
| 3,284,250 | 11/1960 | Yeo | 75/128 A |
| 3,311,511 | 3/1967 | Goller | 75/128.5 |

FOREIGN PATENTS OR APPLICATIONS

| | | | |
|---|---|---|---|
| 1,214,005 | 4/1966 | Germany | 75/128 A |

*Primary Examiner*—L. Dewayne Rutledge
*Assistant Examiner*—Arthur J. Steiner
*Attorney, Agent, or Firm*—Melville, Strasser, Foster & Hoffman

[57] ABSTRACT

Chromium-nickel-manganese steel characterized by good welding properties, which steel in the as-welded condition enjoys a combination of strength, ductility and impact resistance, along with good resistance to intergranular corrosion and good resistance to general corrosive attack. The steel contains about 20% to 25% chromium, about 6% to 17% nickel, about 3.5% to 7% manganese, about .15% to .50% nitrogen, with carbon not exceeding about .08, and with at least one of the three ingredients molybdenum, columbium and vanadium. For a best combination of properties at least two of the three ingredients are employed.

3 Claims, No Drawings

HIGH STRENGTH CORROSION-RESISTANT STAINLESS STEEL

Matter enclosed in heavy brackets [ ] appears in the original patent but forms no part of this reissue specification; matter printed in italics indicates the additions made by reissue.

In introduction, our invention relates to the alloy steels and, more especially, to the high-strength stainless steels.

One of the objects of our invention is the provision of a stainless steel which is substantially austenitic under all conditions, which readily lends itself to hot-working into plate, sheet, strip or rod and wire products and which, moreover, is readily rolled or drawn in the cold-mill as in the production of cold-rolled plate, sheet and strip and cold-drawn rods and wire.

Another object is the provision of such an alloy steel which is readily fabricated into a host of articles and products of ultimate use, as by pressing, bending, cutting, blanking, tapping and the like and, moreover, is readily welded by conventional welding techniques, which fabricated articles and products possess high strength in combination with good corrosion-resistance and good resistance to intercrystalline corrosion in the as-welded condition without necessity for hardening heat-treatment.

A further object is the provision of an austenitic stainless steel which preferably, although not necessarily, is fully austenitic and free of delta-ferrite at elevated temperatures, at room temperatures and at cryogenic temperatures, which austenitic structure is fully retained even after drastic cold-reduction.

Other objects of our invention will become apparent during the course of the disclosure which follows.

Accordingly, then, our invention will be seen to reside in the combination of the ingredients making up our novel steel and the relationship between each of the same with one or more of the others, and in the various articles and products fashioned thereof, all as more particularly described herein and set forth in the claims at the end of this specification.

BACKGROUND OF THE INVENTION

Now in order to better understand certain features of our invention, it may be well to note at this point that there are a great many alloys presently available for duties in the aerospace industries, the chemical industries, and others where strength, resistance to corrosion, ease of fabrication, and the like are required. And many of these are suited to applications where there are encountered high temperatures in use and where there additionally are encountered corrosive atmospheres—atmospheres containing chlorides and atmospheres of a general oxidizing character. We refer particularly to certain of the nickel-base alloys such as "Inconel 625" (20% chromium, 9% molybdenum, 3% columbium, 3% iron, and remainder nickel). These alloys, because of the high nickel content, are costly.

A further class of alloys is the chromium-nickel austenitic stainless steels, notably AISI Type 304 (18% to 20% chromium, 8% to 12% nickel, manganese 2% max., carbon 0.08% max., and remainder iron), Type 347 (17% to 19% chromium, 9% to 13% nickel, 2% max. manganese, carbon 0.08% max., with columbium-tantalum at least 10 times the carbon content, and remainder iron). A further and more important stainless steel is the Type 316 (16% to 18% chromium, 10% to 14% nickel, 2% to 3% molybdenum, 2% max. manganese, carbon .08% max., and remainder iron).

A still further stainless steel is the Armco 21-6-9 (20.25% chromium, 6.5% nickel, 9% manganese, .15% to .40% nitrogen, carbon not exceeding .08%, and remainder iron).

Although the austenitic chromium-nickel stainless steels referred to are less costly than the nickel-base alloys, they either are lacking in weldability, are characterized by a low ratio of strength-to-weight, or have insufficient strength to meet the requirements of many applications.

Accordingly, it is one of the objects of our invention to provide a chromium-nickel stainless steel which is significantly leaner than the nickel-base alloys, which chromium-nickel stainless steel is substantially austenitic under all conditions, which readily lends itself to conversion in the hot-mill and the cold-mill, which lends itself to a variety of forming and fabricating operations, which is readily weldable, and which in welded condition is resistant to intercrystalline corrosion and to the general corrosion conditions encountered in the aerospace, the chemical, and a variety of industries in which welded assemblies are required.

SUMMARY OF THE INVENTION

Referring now more especially to the practice of our invention, we provide an alloy steel essentially consisting of the ingredients chromium, nickel, manganese, and nitrogen, with one or more of molybdenum, columbium and vanadium, and the remainder substantially iron. The chromium content of our steel ranges from about 20% to about 25%, the nickel from about 6% to about 17%, the manganese from about 3.5% to about 7% and for best results to a figure less than 6% (notably 5.9%), the molybdenum from about .5% to about 4%, the nitrogen from about .15% to about .50%, with columbium optional up to about .4% where vanadium is present in the amount of .05% to about .5%, and columbium about .1% to about .7% where vanadium is optional in amounts up to about .5%, with remainder substantially iron. Where both columbium about .1% to about .4% and vanadium about .05% to about .5% are present in our steel the ingredient molybdenum is optional; it may be employed in amounts up to about 4%, preferably less than 3%. In short, at least one of the ingredients molybdenum, columbium and vanadium is employed. The steel enjoying the best combination of properties, however, essentially contains at least two of the three ingredients, especially the ingredient molybdenum and one or both of columbium and vanadium, as appears more fully hereinafter.

The carbon content of our steel is less than .08% and usually is less than .06%, preferably about .03% to .06%. Silicon may be present in amounts up to about 1% under some circumstances, although the silicon content desirably is maintained at a value under .5%, preferably about .25% to about .4% for best results.

Phosphorus and sulphur, commonly present in all stainless steels, are present in our steel up to about .060% phosphorus and up to about 0.30% sulphur. We endeavor, however, to maintain a sulphur content not exceeding about 0.20% and preferably not over about .005% in order to assure a freedom from stringer inclusions in certain applications. The ingredient titanium, which frequently is employed in certain of the stainless steels for special purposes, is particularly avoided in our steel, for we find that titanium is inclined to give dirty metal with resulting adverse effect on corrosion-resistance.

Each of the several ingredients chromium, nickel manganese, molybdenum and/or columbium and/or vanadium and nitrogen is critical to the steel of our invention. None of these may be dispensed with. And by the same token, the percentage ranges of none may be departed from without a loss or sacrifice of one or more of the desried properties.

DESCRIPTION OF THE PREFERRED EMBODIMENTS

While the alloy steel of our invention in broadest aspects is defined above, a best combination of properties is had in a steel of more limited composition range. Thus a preferred steel according to our invention essentially consists of about 21% to about 25% chromium, about 7.5% to about 16% nickel (especially about 9.5% to about 15.5% nickel), about 4% to less than 6% manganese, at least two of the ingredients molybdenum, columbium and vanadium, with molybdenum about 1% to about 3% (or about 1.5% to about 2.5% molybdenum), about .2% to about .4% columbium, about .1% to about .5% vanadium, about .20% to about .40% nitrogen, silicon less than .5% (especially not over .4% and preferably .25% to .4%), carbon not over about .06% (especially carbon about .03% to about .06%), and remainder essentially iron. This steel is possessed of good corrosion-resistance even after a welding operation, this along with good mechanical properties.

In a further preferred steel, we employ about 20.5% to about 25% chromium, about 11% to about 13% nickel, about 4.5% to about 5.5% manganese, about 1.5% to about 2.5% molybdenum, about .20% to about .40% columbium and/or about 0.5% to about .40% vanadium, about .20% to about .40% nitrogen, carbon up to about .05%, and remainder essentially iron. The preferred steel additionally is found to be wholly austenitic and non-magnetic, even after having suffered a cold-reduction of as much as 60%.

In another steel we employ about 23% to about 25% chromium, about 11.5% to about 15.5% nickel, about 4.5% to about 5.5% manganese, about 1.5% to about 2.5% molybdenum, about .15% to about .30% columbium, about .10% to about .50% vanadium, about .30% to about .40% nitrogen, carbon not exceeding about .05%, and remainder essentially iron. This steel too is free of ferrite. A further ferrite-free steel, that is, a steel which is wholly austenitic, essentially consists of about 23.5% to about 24.5% chromium, about 13% to about 15.5% nickel, about 4.5% to about 5.5% manganese, about 1.75% to about 2.25% molybdenum, about .15% to about .30% columbium, about .10% to about .30% vanadium, about .30% to about .40% nitrogen, with a carbon content not exceeding about .06%, and remainder essentially iron. A still further steel which, although not entirely free of ferrite nevertheless is useful in most applications, essentially consists of about 23% to 24% chromium, about 9.5% to about 10.5% nickel, about 4.5% to 5.5% manganese, about 1.75% to about 2.25% molybdenum, about .15% to about .25% columbium, about .15% to about .25% vanadium, about .30% to about .40% nitrogen, with carbon not exceeding about .06%, and remainder substantially all iron. This steel is of desired corrosion-resistance and strength, and additionally is of minimum cost; i.e., it requires a minimum of the costly alloying ingredients nickel, molybdenum, columbium and vanadium. Other particular steels according to our invention are described hereinafter.

As noted above, the chromium, the nickel, the manganese, the molybdenum, the columbium, the vanadium, and the nitrogen contents of our steel are in every sense critical, and so too the carbon content. For we find that where the ranges of any one of these purposefully added ingredients are departed from there is a loss or sacrifice of one or more of the desired properties. Thus, as to the chromium content, where the chromium is less than about 20% there is a loss of the desired general corrosion-resisting properties. Moreover, with insufficient chromium there is a loss of its stabilizing effect on the austenitic structure and a decrease in the capacity for nitrogen. In point of fact, we find that with less than about 23% chromium, and certainly less than 20.5% chromium, the metal in the as-welded condition is inclined to lose the desired resistance to corrosion. With an excess of chromium, that is, chromium exceeding about 25%, it becomes necessary to introduce an excessive nickel content in order to preserve the austenitic balance. And as a further matter, with the excess chromium the workability of the metal directly suffers, that is, it becomes difficult to work in the hot-mill and in the cold-mill as well. Moreover, with an excess chromium content delta-ferrite appears, which causes further difficulties in the hot-mill, the metal being inclined to split and tear.

The nickel content of our steel ranges from about 6% to about 17%, preferably about 9.5% to about 15.5%, as noted. For we fined that with a nickel content less than about 6%, and generally where less than about 9.5% and certainly where less than about 8%, the steel loses its austenitic character, that is, delta-ferrite appears and the steel becomes slightly magnetic. And with an excess of nickel, that is, nickel exceeding about 17%, or even where in excess of about 15.5% or about 16%, there is a loss of strength which we in part attribute to the restricting effect of nickel on the solubility for carbon and nitrogen. It is our view that nickel is desirably kept down to such level as to balance the chromium and molybdenum contents of the steel and maintain the desired fully austenitic structure. Any excess of nickel, of course, makes the steel unnecessarily costly.

While the manganese content of our steel ranges from about 3.5% to about 7% and especially to something short of 6% (notably 5.9%), we prefer a manganese content from about 4% to less than 6% or even about 4.5% to about 5.5%. With a manganese content short of about 3.5% it becomes difficult to retain the necessary nitrogen content and the metal is inclined to become gassy and porous, with undesired loss of mechanical properties. And, too, with insufficient manganese the weldability of the metal directly suffers. On the other hand, with an excessively high manganese content, that is, a manganese content of 6% or more, and certainly a manganese content exceeding about 7%, the steel is inclined to become ferritic and the corrosion-resisting characteristics are adversely affected. Particularly, the steel loses its resistance to intercrystalline corrosion, especially in the sensitized condition, that is, after heating at a temperature of about 1250° F., as encountered, for example, in a welding operation.

For a best combination of properties molybdenum is employed in our steel, this in an amount of about .5% to about 4%, and more especially in the amount of about 1.5% to about 3% or about 1.5% to 2.5%. We find that molybdenum gives a higher tolerance for carbon and as a result improves the resistance to intercrystalline corrosion following welding or other heating. At least about 1% molybednum usually is necessary to give any significant benefit. The ingredient molybdenum also contributes to the strength of the steel, improves the general corrosion-resistance, and lowers the tendency of the metal to pit in corrosive media. Where molybdenum is present in an amount exceeding about 4%, or even about 3%, it becomes difficult to maintain the austenitic structure of the metal without resorting to an increase in nickel, this at further cost and other undesired result. Actually, we find little increased benefit with a molybdenum content over about 2.5%. Where one or more of the desired properties of our steel may be sacrificed in favor of a lower cost the molybdenum may be omitted in favor of an addition of both columbium and vanadium as pointed to above and more fully developed hereinafter.

Both the nitrogen content and the carbon content of our steel likewise are critical. As noted, we employ a nitrogen content in the amount of about .15% to about .50%, more especially about .20% to about .40%, although a best combination of properties is had with a nitrogen content of about .30% to about .40%. Nitrogen serves to increase the strength of the steel, this without adversely affecting either the general corrosion-resistance of the metal or the resistance to intercrystalline corrosion following a welding or other heating. With a nitrogen content less than about .20%, and certainly with a nitrogen content less than about .15%, there is no significant benefit. But where the nitrogen content exceeds about .40%, and especially where it exceeds about .50%, the corrosion-resistance suffers and, too, there is the danger of the metal becoming gassy, with untoward results as noted above.

The carbon content of our steel preferably is maintained at a value not exceeding .05%. For with this carbon content the steel is essentially insensitive to intercrystalline corrosion, although it may amount to as much as .06% where the chromium content and the molybdenum content are on the high side. And where the columbium and vanadium contents also are on the high side, the carbon content may very well amount to something less than .08%. With a carbon content of .08% or more the corrosion-resisting properties directly suffer; more particularly, there is a loss of the general corrosion-resisting characteristics of the steel as well as a loss of its resistance to intercrystalline attack. Certain benefits are had by employing at least about .03% carbon, this ranging up to about .06%; a purposeful carbon content helps to maintain the desired austenitic structure and lend strength to the metal.

As indicated above, for best results, one or both of columbium and vanadium are employed in our steel. (Where molybdenum is omitted from the steel both columbium and vanadium are used together, as noted above.) Where vanadium is present in the amount of about .05% to about .5%, columbium is employed in amounts up to about .4%. And where columbium is employed in amounts of about .2% to about .4%, vanadium may be used in amounts up to about .5%. An excess of vanadium as well as an excess of columbium imbalances the alloy steel, requiring further nickel additions, with the resultant disadvantages noted above, all without significant benefit.

We feel that the desired columbium addition very well may interact with the molybdenum present in the preferred steel, giving some solution-hardening effect. Regardless of theoretical considerations, however, the columbium addition, although significantly less than the stoichiometric requirement of the carbon present, contributes to the strength of the steel and at the same time gives resistance to intercrystalline corrosion. We find too, that the columbium-bearing steel is of somewhat finer grain structure, especially in the flat-rolled products, particularly sheet and strip.

A best combination of mechanical strength and corrosion-resistance is has where both columbium and vanadium are employed in the steel, the columbium there being in the amount of about .15% to about .30% and the vanadium being in the amount of about .10% to about .30%.

In our steel the ingredient silicon usually is employed in purposeful amount. In general this amounts to about .25% to about .40%, although for certain applications, i.e., resistance to corrosion by the combustion products of the leaded fuels, silicon may be as low as .1%, or even less. Silicon permissibly may be employed in amounts up to .50% as a maximum, however, for we find that with higher silicon contents, that is, silicon above .50%, and certainly in amounts exceeding .7%, there is an inclination toward the development of the sigma phase. And we find that intergranular corrosive attack of the metal increases where the silicon content is in excess of .50%. Silicon in the amount of about .40% serves to assure clean metal, metal substantially free of oxide inclusions.

The phosphorus and sulphur contents of our steel are low, the phosphorus being permissibly present in amounts up to .030% and the sulphur an amounts up to .020%. Larger amounts of these ingredients appear to lower the general corrosion-resisting qualities of the steel.

As a matter of convenience the steel of our invention is melted in the electric arc furnace or in the induction furnace in accordance with known melting practices. The vacuum furnace, however, generally is not suited to the melting of our steel because the vacuum operation eliminates some of the nitrogen and manganese necessary and essential to the steel.

Following melting, the steel is cast into ingots which in due course are converted into slabs, blooms and billets. As desired, these are reheated and the metal hot-rolled into plate, sheet, strip, bars, rod and wire. These products conveniently are further converted into cold-rolled plate, sheet and strip or cold-drawn wire. The metal works well in both the hot-mill and the cold-mill. Of course, it will be understood that, where desired, the billets may be converted into forging stock and fashioned into a variety of products. Also, it will be understood that the metal may be remelted and cast into a variety of cast articles. Both the forgings and the castings may be finished by known machining and finishing operations.

The steel of our invention is supplied to various customer fabricators in the form of plate, sheet, strip, bars, rod, wire and the like. It is supplied in the hot-rolled condition or, as desired, it is supplied in the cold-rolled or cold drawn, annealed and pickled condition, with annealing at a temperature of about 1700° to 2100° F.

Or, of course, the steel may be supplied the customer in the form of sheet and strip which have been lightly cold-rolled following annealing and pickling.

The steel of our invention readily lends itself to a variety of forming operations as noted above, i.e., pressing, bending, drawing, shearing and threading. Moreover, it readily may be brazed or welded as in the fabrication of a variety of products, apparatus and equipment of ultimate use.

As particularly illustrative of the steels of our invention there is presented below in Table I(a) a series of chromium-nickel-manganese-molybdenum-nitrogen alloy steels of closely related compositions. Most of these steels are of such chemical composition that there is enjoyed a combination of many, if not all, of the desired properties of our preferred steel, and are considered to be according to our invention. The others are of such composition that they are deficient in properties, with composition falling outside of the acceptable steels of our invention in the matter of one or more of the ingredients employed.

TABLE I(a)

Chemical Composition of Ten Chromium-Nickel-Manganese-Molybdenum-Nitrogen Alloy Steels

| Heat No. | C | Mn | Cr | Ni | N | Mo | Cb |
|---|---|---|---|---|---|---|---|
| R6384 | .032 | 4.32 | 17.63 | 7.15 | .27 | 2.81 | — |
| R6382 | .038 | 4.18 | 18.26 | 8.09 | .28 | 2.83 | — |
| R6383[1] | .042 | 4.40 | 20.13 | 9.12 | .27 | 2.81 | — |
| R6765[1] | .030 | 5.06 | 21.81 | 10.88 | .28 | 2.75 | .36 |
| R6766[2] | .033 | 5.22 | 23.16 | 12.29 | .31 | 2.84 | — |
| R6767[1] | .036 | 5.15 | 23.10 | 12.22 | .31 | 2.82 | .29 |
| R6844[2] | .028 | 5.04 | 21.33 | 11.20 | .30 | 2.81 | .22 |
| R6845[2] | .030 | 5.28 | 22.96 | 12.80 | .37 | 2.82 | — |
| R6862[2] | .024 | 5.02 | 22.81 | 12.67 | .29 | 2.14 | .16 |
| R6863[2] | .022 | 4.98 | 23.21 | 12.24 | .26 | 2.14 | .31 |

[1]Steels of the invention.
[2]Steels of the invention having a best combination of properties.
NOTE: All heats: phosphorus, .020% max.; sulphur, .015% max.; silicon, .40% max.

The differences between the properties of an acceptable steel according to our invention and the steels which are not acceptable in terms of structure, resistance to corrosion in the presence of nitric acid in the sensitized condition, and resistance to corrosion in the presence of ferric sulphate ($Fe_2(SO_4)_3$)-sulfuric acid ($H_2SO_4$) that condition, both as measured in inches per month (IPM), will be apparent from a study of the Table I(b) below in which these properties are set forth. The tests reported were had on bar specimens sensitized by heating at a temperature of 1250° F. for one hour and cooling in air.

TABLE I(b)

Percent Ferrite and Rate of Intercrystalline Attack on the Steels of Table I(a)

| Heat No. | Percent ferrite | Huey rate-IPM[2] sensitized | $Fe_2(SO_4)_3$-IPM[2] sensitized |
|---|---|---|---|
| R6384 | 0 | .0031 | .0017 |
| R6382 | 0 | .0044 | .0028 |
| R6383[3] | <1 | .0075 | .0054 |
| R6765[3] | 2.5 | .0123 | .0013 |
| R6766[4] | 1.5 | .0011 | .0012 |
| R6767[3] | 5 | .0191 | .0016 |
| R6844[4] | 1 | .0011 | .0017 |
| R6845[4] | <1 | .0005 | .0009 |
| R6862[4] | 3 | .0016 | .0008 |

TABLE I(b)-continued

Percent Ferrite and Rate of Intercrystalline Attack on the Steels of Table I(a)

| Heat No. | Percent ferrite | Huey rate-IPM[2] sensitized | $Fe_2(SO_4)_3$-IPM[2] sensitized |
|---|---|---|---|
| R6863[4] | 4.5 | .0009 | .0008 |

[1]Huey rate-IPM, attack of samples by boiling nitric acid as measured in inches per month.
[2]$Fe_2(SO_4)_3$-IPM, attack of samples by ferric sulphate-$H_2SO_4$ as measured in inches per month (Streicher test).
[3]Steels of the invention.
[4]Steels of the invention having a best combination of properties.

The mechanical properties of the steels of Table I(a) in bar form are set out below in Table I(c). While none of these steels is possessed of sufficient yield strength to be suited to all applications of the best steel according to our invention, these steels nevertheless are possessed of a good combination of resistance to corrosive attack in a sensitized condition, a minor amount of ferrite, and good ductility, as well as good impact strength at cryogenic temperatures, temperatures as low as −320° F.

TABLE I(c)

Room Temperature Mechanical Properties of the Steels of Table I(a) and Impact Properties at −320°F.

| Heat No. | Ultimate tensile strength (k.s.i.) | 0.2% yield strength (k.s.i.) | Percent elongation | Percent reduction in area | Charpy V-notch (ft./lbs.) |
|---|---|---|---|---|---|
| R6384 | 106 | 54 | 50 | 72.5 | 90 |
| R6382 | 107 | 54.5 | 50 | 73 | 117 |
| R6383[1] | 108 | 55 | 49.5 | 74 | 107 |
| R6765[1] | 119 | 62 | 43 | 65 | 29 |
| R6766[2] | 113.5 | 56 | 48.5 | 71 | 89 |
| R6767[2] | 122 | 66.5 | 42 | 63.5 | 26 |
| R6844[2] | 119 | 63.5 | 45.5 | 66 | — |
| R6845[2] | 119.5 | 63.5 | 48 | 79 | — |
| R6862[2] | 117 | 60.5 | 45.5 | 68 | — |
| R6863[2] | 117 | 60.5 | 42 | 65.5 | — |

[1]Steels of the invention.
[2]Steels of the invention having a best combination of properties.

In studying the test data presented above in Tables I(b) and I(c) it becomes readily apparent that the steels of the lower chromium contents are singularly deficient in resistance to corrosive attack in the sensitized condition, that is, the condition following a welding operation. An acceptable steel is characterized by a Huey rate of attack no greater than .0020 inch per month. The steels of Heat Nos. R6384 and R6382, with chromium contents of 17.63% and 18.26% respectively, nickel contents correspondingly of 7.15% and 8.09%, carbon in the amount of about .04%, manganese about 4.2% nitrogen about .27% and molybdenum about 2.82%, show Huey rates respectively of .0031 and .0044 IPM. And although the ferrite content is low, the steels are unacceptable for use in the as-welded condition. The steels of Heat Nos. R6383, R6765 and R6767 of the higher chromium contents 20.13%, 21.81% and 23.10% respectively, and the higher nickel contents 9.12%, 10.88% and 12.22 %, have even higher Huey rates. We feel that the somewhat higher carbon content of the steel of Heat No. R6383 for its chromium content (.042% carbon with 20.13% chromium) works against the resistance to corrosive attack in the sensitized condition. Although the steels of Heat Nos. R6765 and R6767 additionally contain the ingredient columbium, and both steels possess the same or greater strength than the others listed, it rather clearly appears that the higher columbium content does not benefit the resistance to corrosive attack. Because of the greater strength in combination with greater ductility had in these three steels, however, they are suited to many useful applications where welding is not involved.

The five steels R6766, R6844, R6845, R6862 and R6863, steels which enjoy a best combination of properties, have chromium contents ranging from the 21.33% chromium of the steel of Heat No. R6844, with a nickel content of 11.20%, to 23.21% chromium with a nickel content of 12.24% for the steel of Heat No. R6863. The carbon contents of these five steels range from .033% for Heat No. R6766 down to .022% for Heat No. R6863. The manganese contents all are on the order of about 5%, with nitrogen about .3% and molybdenum about 2.8% (although the Heat Nos. R6862 and R6863 are of lower molybdenum content), some with and some without a columbium addition. All five steels are characterized by a low rate of corrosive attack in sensitized condition, as well as being substantially austenitic, that is, with a ferrite content not exceeding about 5%. Moreover, the strength is high, this being best for the steels with a columbium content, that is, a columbium content of .16% for the Heat No. R6862 and .31% for the Heat No. R6863.

The steel according to our invention, which is characterized by a combination of resistance to intergranular corrosive attack in the sensitized condition, a substantially austenitic structure and good tensile properties, employs a chromium content of about 21% to 23% or more, a nickel content of about 11% to about 13%, along with a carbon content not exceeding about .04%, a manganese content of about 5%, a nitrogen content of about .3%, a molybdenum content of about 2% to about 3%, with or without a columbium content of about .1% to about .3%. More broadly, such as steel essentially consists of about 21% to about 24% chromium, about 11% to about 13% nickel, about 4.5% to about 5.5% manganese, carbon not exceeding about .05%, a silicon content not exceeding .4%, with about .25% to about .4% nitrogen, about 2% to about 3% molybdenum, with or without columbium up to about .4%, and remainder substantially all iron.

A more preferred steel, a steel which is wholly austenitic under all conditions and which is virtually insensitive to corrosive attack in the sensitized condition is illustrated in the six examples of specific steels set out in Table II(a) below. Such a steel essentially consists of about 23% to about 24% chromium, about 15% to about 16% nickel, about 4.5% to 5.5% manganese, about .025% to .035% carbon, about .3% to .4% nitrogen, about 2.5% to 3%

TABLE II(a)

Six Chromium-Nickel-Manganese-Molybdenum-Nitrogen Steels According to the invention

| Heat No. | C | Mn | Cr | Ni | N | Mo | Cb |
|---|---|---|---|---|---|---|---|
| R6908[1] | .030 | 4.99 | 23.63 | 15.28 | .30 | 2.73 | .02 |
| R6909[1] | .031 | 3.95 | 23.56 | 15.25 | .29 | 2.73 | .23 |
| R6910[1] | .027 | 5.00 | 23.97 | 15.35 | .28 | 2.73 | .41 |
| R6911[1] | .033 | 4.95 | 23.45 | 15.50 | .35 | 2.73 | .04 |
| R6912[1] | .031 | 4.95 | 23.86 | 15.27 | .34 | 2.74 | .22 |
| R6913[1] | .029 | 5.04 | 23.85 | 15.35 | .33 | 2.70 | .43 |

[1]Steels of the invention having a best combination of properties.

NOTE: All heats: phosphorus, about .015%; sulphur, about .007%; silicon, about .3%.

The structure of the steels of Table II(a) in bar form, as well as their Huey rates and resistance to attack by ferric sulphate are set out in Table II(b) below:

TABLE II(b)

Structure and Rate of Attack in Sensitized Condition of the Steels of TABLE II(a)

| Heat No. | Percent ferrite | Huey rate-IPM, sensitized | $Fe_2(SO_4)_3$IPM, sensitized |
|---|---|---|---|
| R6908[1] | 0 | .0004 | .0007 |
| R6909[1] | 0 | .0007 | .0008 |
| R6910[1] | 0 | .0007 | .0008 |
| R6911[1] | 0 | .0004 | .0007 |
| R6912[1] | 0 | .0007 | .0007 |
| R6913[1] | 0 | .0007 | .0008 |

[1]Steels of the invention having a best combination of properties.

The mechanical properties of the steels of Table II(a) in bar form are given below in Table II(c). They are suited to many applications where a wholly austenitic steel enjoying great resistance to corrosive attack in the sensitized condition, along with good impact strength at low temperatures, is required.

TABLE II(c)

Room Temperature Mechanical Properties of the Steels of Table II(a) and Impact Properties at −320° F.

| Heat No. | Ultimate tensile strength (k.s.i.) | 0.2% yield strength (k.s.i.) | Percent elongation | Percent reduction in area | Charpy V-notch (ft./lbs.) |
|---|---|---|---|---|---|
| R6908[1] | 116 | 55.5 | 49.5 | 68.5 | 99 |
| R6909[1] | 124 | 65 | 40.5 | 64 | 42 |
| R6910[1] | 123 | 64 | 38.5 | 56 | 23 |
| R6911[1] | 119.5 | 58.5 | 50 | 72 | 120 |
| R6912[1] | 128.5 | 67.5 | 42.5 | 63.5 | 45 |
| R6913[1] | 129.5 | 69 | 38 | 56.5 | 19 |

[1]Steels of the invention having a best combination of properties.

In studying the test results set out in Table II(b) and II(c) above it will be noted that all steels of Table II(a) are wholly austenitic and are possessed of extremely low rates of attack in boiling nitric acid and in ferric sulphate-sulphuric acid while in the sensitized condition, and while of modest strength, are characterized by good ductility and impact resistance, this latter perhaps excepting the two steels of Heat Nos. R6910 and R6913 of high columbium content. We feel that while columbium contributes to tensile strength, it adversely affects impact resistance at cryogenic temperatures.

The preferred steel according to our invention represents a best combination of austenitic structure, virtual freedom from intergranular attack in the sensitized condition, that is, a low Huey rate of attack, a minimum of precipitated carbides after sensitization as reflected by the Solar Carbide rating [1], and good mechanical properties, both at room temperatures and at high temperatures as well. Some thirty-six chromium-nickel-manganese-nitrogen stainless steels in the form of sheet, seven of which steels are of chemical composition according to our preferred steel and twenty-one of which generally answer to the requirements of our invention, with the remaining eight steels being of similar composition except one or more of the ingredients fall outside the composition range of the steels of our invention, are set out below in Table III(a).

[1] Test developed by Solar Aircraft Co., San Diego, Calif.: Electrolytic etch in 10% chromic acid solution; view at 500X; rate 1 to 6 on the basis of 1 being for no carbides showing and 6 for a continuous network of carbides.

TABLE III(a)

Chemical composition of thirty-six chromium-nickel-manganese-nitrogen stainless steels

| Heat No. | C | Mn | Cr | Ni | Mo | N | Cb | V |
|---|---|---|---|---|---|---|---|---|
| | | | 21 Cr-6 Ni-3 to 4 Mn | | | | | |
| 4287-2 | .052 | 3.20 | 21.00 | 6.04 | — | .30 | .09 | — |
| 4287-3 | .052 | 3.18 | 21.08 | 6.00 | — | .31 | .14 | .20 |
| 4293-1 | .049 | 3.24 | 21.12 | 6.06 | 2.12 | .33 | — | — |
| 4293-3 | .049 | 3.27 | 21.20 | 6.04 | 2.17 | .33 | .16 | .18 |
| 4303-1 | .046 | 3.87 | 21.34 | 6.05 | — | .31 | — | — |
| 4303-2[1] | .046 | 3.83 | 21.22 | 6.06 | — | .31 | .06 | — |
| 4303-3[2] | .046 | 3.86 | 21.22 | 6.03 | — | .31 | .14 | .21 |
| 4313-1[1] | .048 | 4.04 | 21.18 | 6.08 | — | .31 | — | .26 |
| 4304-1[1] | .044 | 3.88 | 21.08 | 6.00 | 2.16 | .31 | — | — |
| 4303-2[1] | .043 | 3.86 | 20.70 | 6.00 | 2.13 | .31 | .06 | — |
| 4303-3[1] | .044 | 3.96 | 20.50 | 5.94 | 2.13 | .30 | .11 | .28 |
| 4320-1[1] | .051 | 4.02 | 21.00 | 6.04 | 2.24 | .32 | — | .26 |
| | | | 21 Cr-9 Ni-4 Mn | | | | | |
| 4311-1 | .050 | 3.87 | 20.60 | 9.03 | — | .32 | — | — |
| 4311-2[1] | .050 | 3.87 | 21.14 | 9.02 | — | .32 | .11 | — |
| 4311-3[2] | .050 | 3.80 | 21.04 | 8.98 | — | .32 | .13 | .20 |
| 4321-1[1] | .054 | 4.05 | 21.40 | 9.04 | — | .31 | — | .28 |
| 4312-1[1] | .049 | 4.10 | 21.12 | 8.99 | 2.19 | .32 | — | — |
| 4312-2[2] | .048 | 4.09 | 21.08 | 8.99 | 2.19 | .32 | .09 | — |
| 4312-3[2] | .048 | 3.96 | 20.76 | 8.93 | 2.19 | .32 | .12 | .17 |
| 4321-2[1] | .052 | 4.03 | 21.00 | 8.93 | 2.10 | .31 | — | .27 |
| | | | 21 Cr-6 Ni-6 Mn | | | | | |
| 4289-1 | .044 | 6.01 | 20.92 | 6.10 | — | .29 | — | — |
| 4289-2[1] | .045 | 5.94 | 21.16 | 6.02 | — | .30 | .054 | — |
| 4289-3[1] | .045 | 5.79 | 20.38 | 5.97 | — | .30 | .13 | .20 |
| 4319-2[1] | .047 | 5.69 | 21.30 | 6.11 | — | .32 | — | .32 |
| 4291-1[1] | .046 | 5.82 | 21.22 | 6.05 | 2.00 | .30 | — | — |
| 4291-2[1] | .046 | 5.64 | 21.22 | 6.05 | 2.06 | .30 | .082 | — |
| 4291-3[1] | .046 | 5.71 | 21.34 | 6.01 | 2.06 | .30 | .14 | .19 |
| 4320-2[1] | .052 | 5.67 | 21.56 | 6.12 | 2.20 | .33 | — | .31 |
| | | | 21 Cr-9 Ni-6 Mn | | | | | |
| 4290-1 | .047 | 5.79 | 20.96 | 8.99 | — | .29 | — | — |
| 4290-2[1] | .046 | 5.75 | 21.18 | 8.97 | — | .29 | .09 | — |
| 4290-3[1] | .048 | 5.75 | 21.10 | 8.96 | — | .29 | .13 | .27 |
| 4319-3[1] | .047 | 5.67 | 21.26 | 8.53 | — | .32 | — | .27 |
| 4292-1[1] | .048 | 5.83 | 20.78 | 9.05 | 2.12 | .29 | — | — |
| 4292-2[2] | .049 | 5.75 | 20.78 | 8.99 | 2.15 | .29 | .09 | — |
| 4292-3[2] | .049 | 5.75 | 21.12 | 8.99 | 2.14 | .29 | .13 | .21 |
| 4320-3[2] | .050 | 5.69 | 21.56 | 8.60 | 2.21 | .32 | — | .36 |

[1]Steels of the invention.
[2]Steels of the invention having a best combination of properties.
NOTE: All heats phosphorus about .002%, sulphur about .008%, silicon about .40%.

The Huey rating in IPM for the steels in sensitized condition, that is, sensitized at 1250° F. for one hour and air cooled, the Solar Carbide rating of these steels in the sensitized condition, the ferrite content, and the percent magnetism of the steels in a 60% cold-rolled condition and in the annealed and pickled condition are given below in Table III(b).

TABLE III(b)

Corrosion-resistance in sensitized condition, ferrite content and magnetism of the steels of Table III (a)

| Heat No. | Huey IPM | Sensitized Solar carbide | Percent ferrite | Percent Magnetism 60% cold reduction | Percent Magnetism Annealed and pickled |
|---|---|---|---|---|---|
| | | 21 Cr-6 Ni-3 to 4 Mn | | | |
| 4287-2 | .0039 | C1 | 0 | 4 | 3 |
| 4287-3 | .0033 | C2 | 0 | 4 | 3 |
| 4293-1 | .0027 | C1 | 6 | 8 | 5 |
| 4293-3 | .0036 | C2 | 8 | 12 | 8 |
| 4303-1 | .0011 | C3 | 0 | 3 | 3 |
| 4303-2[1] | .0012 | C3 | 0 | 3 | 3 |
| 4303-3[2] | .0015 | C3 | 0 | 3 | 3 |
| 4313-1[1] | .0010 | C2 | 0 | 4 | 3 |
| 4304-1[1] | .0038 | C1 | 6 | 9 | 5 |
| 4304-2[1] | .0036 | C1 | 8 | 9 | 6 |
| 4304-3[1] | .0040 | C2 | 8 | 12 | 9 |
| 4320-1[1] | .0052 | C3 | 10 | 13 | 9 |
| | | 21 Cr-9 Ni-4 Mn | | | |
| 4311-1 | .0007 | C3 | 0 | 3 | 3 |
| 4311-2[1] | .0022 | C4 | 0 | 3 | 3 |

TABLE III(b)-continued

Corrosion-resistance in sensitized condition, ferrite content and magnetism of the steels of Table III (a)

| Heat No. | Huey IPM | Sensitized Solar carbide | Percent ferrite | Percent Magnetism 60% cold reduction | Percent Magnetism Annealed and pickled |
|---|---|---|---|---|---|
| 4311-3[2] | .0020 | C4 | 0 | 3 | 3 |
| 4321-1[1] | .0016 | C3 | 0 | 3 | 3 |
| 4312-1[1] | .0008 | C1 | 0 | 4 | 3 |
| 4312-2[2] | .0015 | C1 | 0 | 4 | 3 |
| 4312-3[2] | .0013 | C1 | 0 | 4 | 3 |
| 4321-2[1] | .0007 | C1 | 0 | 3 | 3 |
| | | 21 Cr-6 Ni-6 Mn | | | |
| 4289-1 | .0009 | C1 | 0 | 3 | 3 |
| 4289-2[1] | .0007 | C3 | 0 | 3 | 3 |
| 4289-3[1] | .0009 | C4 | 0 | 3 | 3 |
| 4319-2[1] | .0011 | C3 | 0 | 4 | 4 |
| 4291-1[1] | .0032 | C1 | 8 | 12 | 9 |
| 4291-2[1] | .0047 | C1 | 10 | 13 | 10 |
| 4291-3[1] | .0047 | C1 | 10 | 16 | 12 |
| 4320-2[1] | .0134 | C3 | 14 | 14 | 10 |
| | | 21 Cr-9 Ni-6 Mn | | | |
| 4290-1 | .0014 | C1 | 0 | 3 | 3 |
| 4290-2[1] | .0019 | C1 | 0 | 3 | 3 |
| 4290-3[1] | .0013 | C1 | 0 | 3 | 3 |
| 4319-3[1] | .0008 | C3 | 0 | 4 | 4 |
| 4292-1[1] | .0011 | C2 | 1 | 3 | 3 |
| 4292-2[2] | .0010 | C1 | 1 | 3 | 3 |
| 4292-3[2] | .0009 | C1 | 1 | 3 | 3 |

TABLE III(b)-continued

Corrosion-resistance in sensitized condition, ferrite content and magnetism of the steels of Table III (a)

| Heat No. | Huey IPM | Sensitized Solar carbide | Percent ferrite | Percent 60% cold reduction | Magnetism Annealed and pickled |
|---|---|---|---|---|---|
| 4320-3[2] | .0008 | C1 | 5 | 6 | 4 |

[1]Steels of the invention.
[2]Steels of the invention having a best combination of properties.
NOTE: A reading of 3 to 4 denotes a non-magnetic material.

The mechanical properties of the steels of Table III(a) in sheet form are set out in Table III(c) below, these being the 0.2% yield strength, the ultimate tensile strength, the percent elongation in 2", and the Rockwell hardness at room temperature conditions (75° F.); and the 0.2% yield strength, the ultimate tensile strength and the percent elongation in 2" at a temperature of 1000° F.

TABLE III(c)

Mechanical properties of the steels of Table III(a) both at 75° F. and 1,000° F.

| Heat No. | 75°F. 0.2% yield str., K s.i. | 75°F. Ult. tens. str., K s.i. | 75°F. Percent elong. in 2" | 75°F. Rockwell$_B$ | 1,000°F. 0.2% yield str., K s.i. | 1,000°F. Ult. tens. str., K s.i. | 1,000°F. Percent elong. in 2" |
|---|---|---|---|---|---|---|---|
| | | | 21 Cr-6 Ni-3 to 4 Mn | | | | |
| 4287-2 | 84.4 | 127.4 | 41 | 23C | 46.7 | 81.8 | 36 |
| 4287-3 | 87.0 | 130.1 | 40 | 27C | 42.0 | 84.2 | 33 |
| 4293-1 | 87.5 | 131.5 | 37 | 27C | 41.8 | 89.8 | 33 |
| 4293-3 | 93.0 | 136.5 | 38 | 29C | 42.9 | 90.5 | 32 |
| 4303-1 | 85.4 | 118.6 | 47 | 96.5 | 34.3 | 75.1 | 40 |
| 4303-2[1] | 88.5 | 126.4 | 42 | 99 | 38.6 | 78.9 | 36 |
| 4303-3[2] | 85.4 | 130.6 | 39 | 25C | 41.5 | 82.8 | 35 |
| 4313-1[1] | 70.4 | 114.5 | 49 | 98 | 32.7 | 76.6 | 39 |
| 4304-1[1] | 83.4 | 129.0 | 41 | 24C | 39.2 | 85.8 | 37 |
| 4304-2[1] | 89.5 | 133.6 | 42 | 27C | 45.7 | 87.8 | 33 |
| 4304-3[1] | 93.8 | 135.5 | 38 | 25C | 50.9 | 91.3 | 30 |
| 4320-1[1] | 79.0 | 125.8 | 42 | 25C | 40.3 | 85.2 | 33 |
| | | | 21 Cr-9 Ni-4 Mn | | | | |
| 4311-1 | 75.6 | 118.9 | 43 | 98 | 35.9 | 79.2 | 38 |
| 4311-2[1] | 79.5 | 123.3 | 41 | 98.5 | 42.5 | 83.2 | 36 |
| 4311-3[2] | 87.7 | 127.1 | 39 | 25C | 45.0 | 87.2 | 34 |
| 4321-1[1] | 70.9 | 114.7 | 44 | 96 | 32.0 | 77.5 | 41 |
| 4312-1[1] | 77.5 | 120.7 | 41 | 96 | 37.9 | 84.7 | 34 |
| 4312-2[2] | 86.6 | 127.7 | 40 | 26C | 45.4 | 90.4 | 31 |
| 4312-3[2] | 88.8 | 130.7 | 37 | 25C | 49.3 | 93.6 | 32 |
| 4321-2[1] | 74.9 | 119.4 | 43 | 98 | 37.1 | 84.5 | 36 |
| | | | 21 Cr-6 Ni-6 Mn | | | | |
| 4289-1 | 63.5 | 109.1 | 51 | 95 | 27.6 | 70.2 | 43 |
| 4289-2[1] | 73.4 | 117.8 | 44 | 98 | 31.3 | 74.3 | 36 |
| 4289-3[1] | 76.6 | 121.3 | 41 | 100 | 35.2 | 79.9 | 35 |
| 4319-2[1] | 70.7 | 114.2 | 48 | 98 | 34.3 | 75.0 | 42 |
| 4291-1[1] | 77.9 | 121.7 | 42 | 22C | 37.9 | 82.6 | 37 |
| 4291-2[1] | 83.2 | 127.0 | 40 | 24C | 42.4 | 85.7 | 33 |
| 4291-3[1] | 87.2 | 128.5 | 37 | 26C | 43.9 | 87.1 | 32 |
| 4320-2[1] | 83.1 | 128.3 | 40 | 25C | 49.0 | 89.0 | 34 |
| | | | 21 Cr-9 Ni-6 Mn | | | | |
| 4290-1 | 63.0 | 107.3 | 47 | 95 | 28.6 | 73.3 | 40 |
| 4290-2[1] | 74.1 | 117.4 | 42 | 98 | 34.0 | 78.9 | 36 |
| 4290-3[1] | 78.3 | 121.7 | 40 | 22C | 36.9 | 82.3 | 36 |
| 4319-3[1] | 68.6 | 112.8 | 47 | 96 | 31.9 | 77.0 | 41 |
| 4292-1[1] | 72.8 | 117.2 | 43 | 98 | 34.8 | 82.6 | 36 |
| 4292-2[2] | 80.6 | 122.7 | 41 | 100 | 41.9 | 87.4 | 34 |
| 4292-3[2] | 83.3 | 125.2 | 40 | 23C | 41.7 | 88.9 | 30 |
| 4820-3[2] | 77.1 | 121.1 | 42 | 21C | 40.6 | 86.9 | 34 |

[1]Steels of the invention.
[2]Steels of the invention having a best combination of properties.

Of the thirty-six chromium-nickel-manganese-nitrogen steels set out above in Tables III(a), (b) and (c), there are only seven which enjoy a best combination of properties, that is, steels which enjoy a substantially wholly austenitic structure under all conditions, which are virtually insensitive to intergranular corrosion in the sensitized condition and which possess a yield strength of at least 75,000 p.s.i. at room temperatures and at least 40,000 p.s.i. at a temperature of 1000° F. These are the steels of Heat Nos. 4303-3, 4311-3, 4312-2, 4312-3, 4292-2, 4292-3 and 4320-3.

All seven of the above steels have a chromium content of about 20.5% to about 22%, a nickel content of about 6% to about 9%, a manganese content of about 3.8% to something just short of 6%, with a carbon content not exceeding about .05%, a nitrogen content of about .3% and with two or more of the ingredients molybdenum, columbium and vanadium, and the remainder substantially all iron. Now the steel of Heat No. 4303-3 contains the ingredients chromium, nickel, manganese, carbon and nitrogen in the amounts of about 21% chromium, about 6% nickel, about 4% manganese, about .05% carbon, together with both of the ingredients columbium and vanadium, one in the amount of about .15% and the other in the amount of about .2%. Molybdenum is absent. Similarly, the steel of Heat No. 4311-3, while of like chromium, manganese, carbon, nitrogen, columbium and vanadium contents, with an absence of molybdenum, employs nickel in the amount of about 9%. The steels of Heats 4312-2 and 4312-3, while similarly employing about 21% chromium, about 9% nickel, about 4% manganese, about .05% carbon, about .3% nitrogen, both employ molybdenum in the amount of about 2.2%, with the one additionally employing columbium in the amount of .1% and the other additionally employing both of the ingredients columbium in the amount of about .1% and vanadium in the amount of about .2%. The steels of Heat Nos. 4292-2, 4292-3 and 4320-3, while also employing about 21% chromium, about 9% nickel, about .05% carbon, about .3% nitrogen and a molybdenum content of about 2%, employ the ingredient manganese is an amount just short of 6%. In addition to molybdenum, the first steel employs columbium in the amount of about .1%, the third steel the ingredient vanadium in an amount of about .4% and the second steel both of the ingredients columbium and vanadium, one in the amount of about .1% and the other in the amount of about .2%.

It will be noted that all of the steels of Heat Nos. 4287-2, 4287-3, 4293-1 and 4293-3 are deficient, employing a chromium content of about 21%, a nickel content of about 6%, a carbon content of about .05%, a nitrogen of some 3.18% to 3.30%, with or without the further ingredients molybdenum, columbium and vanadium. The steel of Heat No. 4303-1 likewise is deficient having in its composition none of the ingredients molybdenum, columbium and vanadium. The five steels either are lacking in resistance to intergranular attack in the sensitized condition or are possessed of insufficient yield strength at high temperatures.

The remaining five steels of the 21% chromium, 6% nickel, 3% to 4% manganese group wherein there is employed at least one of the ingredients molybdenum, columbium and vanadium answer to the requirements of our invention and are suited to many useful applications. And, as noted above, one of these steels (Heat No. 4303-3), with both columbium and vanadium but without molybdenum, enjoys a best combination of properties. The single Heat No. 4304-3 employing all three of molybdenum, columbium and vanadium, while of greatest strength, has a rather high Huey rate and is substantially magnetic. Nevertheless, as noted, the steel is suited to many applications.

The steels having a chromium content of about 21%, with a manganese content of about 4% and a nickel content of about 9% are in full accordance with the teachings of our invention where they employ both columium and vanadium with molybdenum absent (Heat 4311-3) or with molybdenum present (Heat 4312-3). The same may be said for the steel containing molybdenum together with columbium (Heat 4312-2). The steel (Heat 4321-2) with the molybdenum and vanadium additions but without a columbium addition, while suited to many applications, does not enjoy the best combination of properties had in the others. The steel of Heat No. 4311-1 employing none of the ingredients molybdenum, columbium and vanadium, is deficient in properties and lies outside the scope of our invention.

The various steels having a chromium content of about 21%, a nickel content of about 6%, a carbon content of about .05%, with the higher manganese content of about 6%, and a nitrogen content of about 3%, with one or more of the ingredients molybdenum, columbium and vanadium, while either somewhat lacking in yield strength at high temperatures or at room temperatures (Heat Nos. 4289-1, 4289-2, 4289-3, 4313-2, 4319-2 and 4291-1) or subject to objectionable intercrystalline corrosion in the sensitized condition (Heat Nos. 4291-1, 4291-2, 4291-3 and 4320-2), nevertheless are suited to many applications. The steel in which none of molybdenum, columbium and vanadium is present (Heat No. 4289-1) is deficient and falls outside the scope of our invention.

The steels having the higher nickel content of about 9%, with a chromium content of about 21%, a manganese content of about 6%, a carbon content of about .05%, and a nitrogen content of about .3% (Heat Nos. 4292-2, 4292-3 and 4320-3) enjoy a best combination of properties only where there additionally is included the ingredient molybdenum in the amount of about 2% and one or both of the ingredients columbium and vanadium. Nevertheless the steels containing one or both of columbium and vanadium without molybdenum (Heat Nos. 4290-2, 4290-3 and 4319-3) as well as the steel with molybdenum but without either columbium or vanadium (Heat No. 4292-1) are suited to many uses. The steel which contains none of the ingredients molybdenum, columbium, and vanadium (Heat No. 4290-1) is deficient.

For a best combination or properties the steel of our invention employs a manganese content of at least 3.5% to somewhat less than 6%, with a nickel content of some 6% to 9%, along with a chromium content of about 20.5% to 22%, a carbon content not exceeding about .06%, a nitrogen content of about .3%, say .25% to .4%, with at least two of the ingredients molybdenum, columbium and vanadium, the molybdenum in the amount of about 1.5% to 2.5%, the columbium in the amount of about .2% to about .4% and the vanadium in the amount of about .1% to about .5%. The phosphorus, the sulphur and the silicon contents are low, as noted above.

As illustrative of the steels of our invention which are not wholly austenitic but which nevertheless are characterized by good resistance to corrosive attack in the sensitive condition and by good yield strength, both at room temperatures and at elevated temperatures, attention is directed to the chromium-nickel-manganese-molybdenum-nitrogen steels set out in Table IV(a) below. These steels additionally contain one or both of the ingredients columbium and vanadium in differing amounts. While many of the steels of the Table IV(a), particularly those with the lower chromium contents, are objectionably subject to corrosive attack in the sensitized condition, others of the steels of somewhat higher chromium content, or which additionally contain the ingredient vanadium, are found acceptable.

TABLE IV(a)

Chemical composition of twenty-four chromium-nickel-manganese-molybdenum-nitrogen steels containing columbium and/or vanadium

| Heat No. | C | Mn | Cr | Ni | Mo | N | Cb | V |
|---|---|---|---|---|---|---|---|---|
| | | | 21.5 to 24 Cr-7.5 Ni-5 Mn | | | | | |
| 4451-1[1] | .052 | 4.78 | 21.7 | 7.46 | 1.02 | .32 | .26 | — |
| 4451-2[2] | .049 | 4.86 | 22.6 | 7.43 | 1.02 | .30 | .25 | — |
| 4451-3[2] | .048 | 4.90 | 23.0 | 7.55 | 1.01 | .31 | .25 | — |

TABLE IV(a)-continued

Chemical composition of twenty-four chromium-nickel-manganese-molybdenum-nitrogen steels containing columbium and/or vanadium

| Heat No. | C | Mn | Cr | Ni | Mo | N | Cb | V |
|---|---|---|---|---|---|---|---|---|
| 4459-1[2] | .053 | 4.85 | 21.64 | 7.54 | 1.02 | .29 | .24 | .22 |
| 4459-2[2] | .054 | 4.83 | 22.44 | 7.50 | 1.02 | .29 | .25 | .21 |
| 4459-3[2] | .053 | 4.84 | 23.84 | 7.52 | 1.00 | .30 | .24 | .20 |
| | | | 21.5 to 24 Cr-9 Ni-5 Mn | | | | | |
| 4453-1[1] | .051 | 4.82 | 21.7 | 8.98 | 1.02 | .29 | .26 | — |
| 4453-2[1] | .050 | 4.88 | 22.5 | 0.01 | 1.02 | .30 | .26 | — |
| 4453-3[2] | .050 | 5.06 | 23.7 | 9.03 | 1.01 | .30 | .26 | — |
| 4454-1[1] | .053 | 4.83 | 21.8 | 8.97 | .99 | .26 | .26 | .20 |
| 4454-2[2] | .053 | 4.72 | 22.3 | 9.03 | 1.00 | .26 | .25 | .19 |
| 4454-3[2] | .054 | 4.72 | 23.5 | 9.12 | .99 | .27 | .24 | .18 |
| | | | 22 Cr-8 Ni-5 Mn | | | | | |
| 4455-1[2] | .055 | 4.96 | 22.5 | 7.85 | 1.05 | .32 | .20 | — |
| 4455-2[2] | .054 | 4.78 | 22.2 | 7.91 | 1.03 | .30 | .44 | — |
| 4455-3[2] | .054 | 4.89 | 22.1 | 7.96 | 1.03 | .31 | .69 | — |
| | | | 22 Cr-7.5 Ni-5 Mn | | | | | |
| 4456-1[1] | .054 | 4.86 | 21.9 | 7.32 | 1.05 | .27 | .17 | .11 |
| 4456-2[1] | .053 | 4.85 | 22.0 | 7.34 | 1.03 | .28 | .19 | .25 |
| 4456-3[2] | .054 | 4.75 | 21.8 | 7.30 | 1.03 | .27 | .18 | .39 |
| 4457-1[1] | .053 | 5.01 | 21.7 | 7.41 | 1.01 | .30 | .70 | .11 |
| 4457-2[2] | .051 | 4.96 | 21.5 | 7.35 | 1.01 | .30 | .71 | .23 |
| 4457-3[2] | .053 | 4.78 | 21.3 | 7.28 | 1.01 | .30 | .70 | .38 |
| 4458-1[2] | .055 | 5.04 | 22.2 | 7.42 | 1.02 | .31 | — | .15 |
| 4458-2[1] | .054 | 4.98 | 21.9 | 7.36 | 1.02 | .31 | — | .30 |
| 4458-3[2] | .053 | 4.89 | 22.1 | 7.42 | 1.02 | .31 | — | .48 |

[1]Steels of the invention.
[2]Steels of the invention having a best combination of properties.
NOTE: All heats phosphorus about .002%, sulphur about .008% and silicon about .4%.

The ferrite content, the magnetic content of the steel in the cold-rolled condition, that is, with a reduction of about 60%, and the Huey rate in inches per month in the sensitized condition, that is, heating at 1250° F. for one hour and air cooling, are given below in Table IV(b).

TABLE IV(b)

Ferrite content, magnetism and Hucy rates of the steels of Table IV(a)

| Heat No. | Percent ferrite | Percent magnetism as cold-rolled | Sensitized Hucy rate, IPM |
|---|---|---|---|
| | | 21.5 to 24 Cr-7.5 Ni-5 Mn | |
| 4451-1[1] | 5 | 4 | .0030 |
| 4451-2[2] | 8 | 9 | .0016 |
| 4451-3[2] | 10 | 14 | .0008 |
| 4459-1[2] | 4 | 7 | .0018 |
| 4459-2[2] | 5 | 12 | .0014 |
| 4459-3[2] | 5 | 21 | .0008 |
| | | 21.5 to 24 Cr-9 Ni-5 Mn | |
| 4453-1[1] | 1 | 3 | .0030 |
| 4453-2[1] | 5 | 6 | .0029 |
| 4453-3[2] | 10 | 10 | .0009 |
| 4454-1[1] | 2 | 4 | .0021 |
| 4454-2[2] | 7 | 8 | .0015 |
| 4454-3[2] | 12 | 16 | .0008 |
| | | 22 Cr-8 Ni-5 Mn | |
| 4455-1[2] | 3 | 3 | .0020 |
| 4455-2[2] | 6 | 9 | .0019 |
| 4455-3[2] | 12 | 11 | .0014 |

TABLE IV(b)-continued

Ferrite content, magnetism and Hucy rates of the steels of Table IV(a)

| Heat No. | Percent ferrite | Percent magnetism as cold-rolled | Sensitized Hucy rate, IPM |
|---|---|---|---|
| | | 22 Cr-7.5 Ni-5 Mn | |
| 4456[1] | 5 | 9 | .0024 |
| 4456-2[2] | 8 | 8 | .0016 |
| 4456-3[2] | 5 | 9 | .0020 |
| 4457-1[1] | 5 | 9 | .0023 |
| 4457-2[2] | 5 | 11 | .0019 |
| 4457-3[2] | 5 | 14 | .0018 |
| 4458-1[2] | 1 | 4 | .0009 |
| 4458-2[1] | 2 | 5 | .0007 |
| 4458-3[2] | 2 | 5 | .0011 |

[1]Steels of the invention.
[2]Steels of the invention having a best combination of properties.

The mechanical properties of the chromium-nickel-manganese-molybdenum-nitrogen steels of Table IV(a) in sheet form are given below in Table IV(c), these including the 0.2% yield strength in kilopounds per square inch, the ultimate tensile strength in kilopounds per square inch and the percent elongation in 2", both at the room temperature and at elevated temperature, that is, a temperature of 1000° F., as well as the Rockwell hardness of the steels at room temperature.

TABLE IV(c)

Mechanical properties of the steels of Table IV(a) both at room temperature and at elevated temperature

| Heat No. | Room temprature 0.2% yield str., K s.i. | Ult. tens. str., K s.i. | Percent elong. in 2" | Rockwell c | 1,000°F. 0.2% yield str., K s.i. | Ult. tens. str., K s.i. | Percent elong. in 2" |
|---|---|---|---|---|---|---|---|
| | | | 21.5 to 24 Cr-7.5 Ni-5 MN | | | | |
| 4451-1[1] | 86.6 | 127.1 | 39 | 25 | 42.7 | 85.4 | 34 |
| 4451-2[2] | 92.9 | 130.7 | 38 | 27 | 52.3 | 86.8 | 33 |
| 4451-3[2] | 94.9 | 133.1 | 37 | 26 | 54.3 | 87.3 | 32 |
| 4459-1[2] | 97.5 | 132.8 | 37 | 27 | 52.6 | 87.6 | 31 |
| 4459-2[2] | 97.7 | 132.2 | 36 | 27 | 54.8 | 87.5 | 31 |
| 4459-3[2] | 101.3 | 134.1 | 34 | 30 | 60.0 | 88.1 | 31 |
| | | | 21.5 to 24 Cr-9 Ni-5 Mn | | | | |

TABLE IV(c)-continued

Mechanical properties of the steels of Table IV(a) both at room temperature and at elevated temperature

| Heat No. | Room temprature 0.2% yield str., K s.i. | Ult. tens. str., K s.i. | Percent elong. in 2" | Rock-well c | 1,000°F. 0.2% yield str., K s.i. | Ult. tens. str., K s.i. | Percent elong. in 2" |
|---|---|---|---|---|---|---|---|
| 4453-1[1] | 87.1 | 126.7 | 39 | 23 | 50.5 | 86.5 | 31 |
| 4453-2[1] | 89.9 | 128.3 | 38 | 25 | 49.1 | 85.8 | 32 |
| 4453-3[2] | 90.5 | 129.5 | 36 | 24 | 51.5 | 86.1 | 31 |
| 4454-1[1] | 79.3 | 122.0 | 40 | 22 | 43.0 | 84.1 | 30 |
| 4454-2[2] | 82.4 | 123.1 | 39 | 23 | 47.5 | 84.6 | 30 |
| 4454-3[2] | 88.0 | 121.8 | 36 | 26 | 52.6 | 86.7 | 31 |
| | | | 22 Cr-8 Ni-5 Mn | | | | |
| 4455-1[2] | 89.7 | 128.2 | 39 | 26 | 48.1 | 86.8 | 32 |
| 4455-2[2] | 93.0 | 129.8 | 37 | 27 | 52.6 | 86.7 | 32 |
| 4455-3[2] | 88.7 | 126.5 | 36 | 27 | 52.8 | 85.7 | 31 |
| | | | 22 Cr-7.5 Ni-5 Mn | | | | |
| 4456-1[1] | 92.5 | 129.4 | 39 | 25 | 48.7 | 85.1 | 31 |
| 4456-2[2] | 93.3 | 128.6 | 38 | 25 | 49.7 | 86.3 | 30 |
| 4456-3[2] | 93.1 | 128.3 | 37 | 26 | 50.6 | 86.9 | 32 |
| 4457-1[1] | 93.2 | 131.2 | 34 | 26 | 53.7 | 85.3 | 28 |
| 4457-2[2] | 91.6 | 130.0 | 35 | 26 | 53.3 | 86.0 | 28 |
| 4457-3[2] | 92.6 | 129.8 | 34 | 26 | 53.1 | 87.2 | 29 |
| 4458-1[2] | 78.8 | 122.1 | 43 | 20 | 40.6 | 83.2 | 35 |
| 4458-2[1] | 79.6 | 124.0 | 42 | 20 | 37.4 | 82.8 | 37 |
| 4458-3[2] | 86.8 | 128.9 | 39 | 24 | 44.9 | 86.4 | 34 |

[1]Steels of the invention.
[2]Steels of the invention having a best combination of properties.

Consideration of the steels of Table IV(a), particularly with regard to the Huey rates, rather quickly reveals that those steels having a chromium content of about 22% and less (Heat Nos. 4451–1, 4453–1, 4453–2, 4454–1, 4456–1, 4457–1 and 4458–2), with a nickel content of about 7.5% to about 9%, a manganese content of about 5%, and a molybdenum content of about 1%, with a nitrogen content of about .3% and a carbon content of about .05%, and additionally containing columbium about .2% to about .3% (about .7% columbium for Heat No. 4457–1 and no columbium for Heat No. 4458–2), are objectionably attacked by boiling nitric acid while in the sensitized condition. These steels nevertheless are of high strength and good ductility and are suited to numerous applications.

The steels of composition like the foregoing except for a somewhat higher chromium content, about 22.4% to about 23.0% (Heat Nos. 4451–2 and 4451–3), as well as those of like nickel, manganese, molybdenum, nitrogen and carbon contents and chromium contents just below and just above 22%, that is, about 21.5% to about 24%, but additionally containing vanadium about .2% (Heat Nos. 4459–1,4459–2 and 4459–3)are characterized lowered rates of intergranular attack in sensitized condition. Such steels, more broadly, essentially consist of about 21.5% to about 24% chromium, about 7% to about 8% nickel, about 4.5% to 5.5% manganese, about .2% to about .40% nitrogen, about .5% to about 1.5% molybdenum, about .2% to about .4% columbium, about .1% to about .4% vanadium, carbon not exceeding about .06% and remainder iron.

The steels having substantially higher nickel content, that is, a nickel content of about 9%, are seen to have an objectionably high rate of corrosive attack in the sensitized condition until the chromium content amounts to about 23.7% and more (Heat No. 4453–3), although where the ingredient vanadium additionally is present a somewhat lesser chromium content, that is, 22.3%, is found sufficient (Heat Nos. 4454–2 and 4454–3). We feel that the small amount of vanadium requires a somewhat lower chromium content or an increase in nickel. These steels of the higher nickel contents, then, essentially consist of about 22% to about 24% chromium, about 9% to about 10% nickel, about 4.5% to about 5.5% manganese, about .2% to about .4% nitrogen, about 1% to about 2% molybdenum, about .2% to about .4% columbium, about .1% to about .4% vanadium, with carbon not exceeding about .05%, and remainder iron.

Steels of the intermediate nickel contents, that is, nickel contents of about 8% (Heat Nos. 4455–1, 4455–2 and 4455–3) are found satisfactory even with a chromium content as low as 22.1% where the columbium content has been significantly increased (Heat No. 4455–3). Although the rate of corrosive attack is lessened somewhat by the increased columbium content, it appears that columbium bests serves to increase the yield strength at elevated temperatures, this as seen by comparing the elevated temperature yield strengths (Table IV(c) of the Heat Nos. 4455–1, 4455–2 and 4455–3 as they increase from 48.1 k.s.i to 528 k.s.i. with the increase in columbium from .20% for the Heat No. 4455–1 to .69% for the steel of heat No. 4455–3, in short from about .2% to about .7% columbium.

The steels having a nickel level of about 7.3% and as much as 21.7% chromium (Heat Nos. 4456–1 and 4457–1 and containing both columbium and vanadium are sensitive to intercrystalline attack in the sensitized condition unless the vanadium is present in an amount of at least about .2% (Heat Nos. 4456–2, 4456–3, 4457–2 and 4457–3). It is noted that the low vanadium content, that is, about .1% (Heat No. 4457–1) the steel is characterized by an objectionably high rate of attack even through the columbium content amounts to about .7%. Although the steels of the 7.3% nickel content in which columbium is absent but in which vanadium is present (Heat Nos. 4458–1, 4458–2 and 4458–3) all are characterized by good resistance to corrosive attack in the sensitized condition, the heat No. 4458–2 appears to possess somewhat lower yield strength at elevated temperatures (37,400 p.s.i.).

A best combination of properties is had with the steels containing columbium, and particularly those containing both columbium and vanadium, as noted above, the columbium being in the amount of about .15% to .5%, or even .7%, and the vanadium from about .1% to .5%. The principal disadvantage in employing the excessively high columbium content, that is, columbium exceeding about .4%, is that the steel becomes unduly magnetic as a result of pulling carbon out of solution and thereby decreasing the austenite potential deriving from the presence of carbon in solid solution (compare Heat Nos. 4455–2 and 4455–3 with Heat No. 4455–1). Additionally, an excessive columbium content promotes the formation of ferrite.

A good combination of resistance to corrosive attack in the sensitive as-welded condition of the metal in combination with good general resistance to corrosive attack and to pitting, together with good tensile strength at room temperature and at elevated temperatures is had in the steels having a carbon content not exceeding about .06%, and preferably not exceeding about .05% (although preferably being at least .03%), this with a chromium content of about 22.5% to 24.5%, a manganese content of about 4.5% to 5.5%, a nickel content of about 7.5% to some 15.5%, a molybdenum content of about .5% to something less than 3%, a nitrogen content of about .3% to about .4%, with columbium and/or vanadium, with the columbium in the amount of about .1% to .5%, particularly .2% to .4%, and the vanadium from about .1% to .5%, and remainder substantially all iron. The sulphur, the phosphorus and the silicon contents are low, the phosphorus being up to about .060%, the sulphur up to about .030% and the silicon up to about .40%, in any event, a figure below .5%, and certainly below 1%.

A best combination according to our invention not only is either substantially or fully austenitic under all conditions, but also is comparatively insensitive to intercrystalline corrosion in the sensitized condition, is possessed of high strength at room temperatures and at elevated temperatures as well, has a high level of general resistance to corrosion, and is particularly free of pitting under the corrosive conditions encountered in use. Such a steel employs a molybdenum content of about 1.5% to about 2.5%, along with a chromium content of some 23.5% to about 24.5%, a nickel content of at least about 9.5% up to about 15.5%, a manganese content of about 4.5% to about 5.5%, a carbon content not exceeding about .06%, a nitrogen content of about .3% to .4%, with one or both of the ingredients columbium and vanadium. The columbium content ranges from about .1% to about .3% and the vanadium content ranges from about .2% to about .4%. The phosphorus and sulphur contents are low and the silicon content is about .4%, or not exceeding .5%. Some twelve chromium-nickel-manganese-molybdenum-nitrogen stainless steels in sheet form, most of which enjoy the desired best combination of properties according to our invention but others of which are of such composition that one or more of the desired properties are lost, although these steels are suited to many applications, are set out below in Table V(a).

TABLE V(a)

Chemical composition of twelve chromium-nickel-manganese-molybdenum-nitrogen stainless steels

| Heat No. | C | Mn | Cr | Ni | Mo | N | Cb | V |
|---|---|---|---|---|---|---|---|---|
| 4639-1[1] | .052 | 5.02 | 23.89 | 9.01 | 2.11 | .38 | .22 | — |
| 4639-1[2] | .051 | 4.90 | 23.82 | 10.37 | 2.12 | .38 | .22 | — |
| 4639-3[2] | .050 | 4.89 | 23.75 | 11.49 | 2.14 | .38 | .21 | — |
| 4640-1[1] | .052 | 4.87 | 24.11 | 9.09 | 2.13 | .36 | — | .23 |
| 4640-2[2] | .052 | 5.03 | 21.08 | 10.37 | 2.13 | .35 | — | .24 |
| 4640-3[2] | .051 | 4.90 | 24.04 | 11.59 | 2.14 | .35 | — | .26 |
| 4641-1[1] | .052 | 4.94 | 24.08 | 9.08 | 2.14 | .35 | .20 | .21 |
| 4641-2[2] | .052 | 4.92 | 24.00 | 10.59 | 2.12 | .34 | .18 | .21 |
| 4641-3[2] | .049 | 4.92 | 23.97 | 11.57 | 2.14 | .35 | .19 | .20 |
| 4642-1[2] | .054 | 4.97 | 24.00 | 13.02 | 2.08 | .34 | .21 | .25 |
| 4642-2[2] | .050 | 4.94 | 24.00 | 14.24 | 2.14 | .34 | .19 | .24 |
| 4642-3[2] | .049 | 4.92 | 23.97 | 15.37 | 2.14 | .34 | .21 | .22 |

[1]Steels of the invention.

[2]Steels of the invention having a best combination of properties.

NOTE: All heats phosphorus about .003%, sulphur about .010%, silicon about .40%.

The amount of ferrite present in the steels of Table V(a) and the percent magnetism in the cold-rolled condition, that is, with a cold-reduction of 60%, as well as the Huey rate in IPM and the Solar Carbide rating, both in the sensitized condition, that is, treatment at 1250° F. for one hour and air cooling, are given below in Table V(b).

TABLE V(b)

Ferrite content, magnetism and corrosion-resistance in sensitized condition of the steels of Table V(a)

| Heat No. | Percent ferrite | Percent magnetism as cold rolled | Sensitized: Huey rate, IPM | Sensitized: Solar carbide |
|---|---|---|---|---|
| 4639-1[1] | 3 | 9 | .0050 | C-3 |
| 4639-2[2] | 2 | 5 | .0018 | C-3 |
| 4639-3[2] | 0 | 3 | .0013 | C-3 |
| 4640-1[1] | 5 | 13 | .0022 | C-2 |
| 4640-2[2] | 3 | 8 | .0008 | C-1 |
| 4640-3[2] | 2 | 4 | .0005 | C-1 |
| 4641-1[1] | 10 | 14 | .0028 | C-1 |
| 4641-2[2] | 5 | 8 | .0011 | C-1 |
| 4641-3[2] | 2 | 4 | .0008 | C-1 |
| 4642-1[2] | 0 | 3 | .0021 | C-3 |
| 4642-2[2] | 0 | 3 | .0010 | C-3 |
| 4642-3[2] | 0 | 3 | .0014 | C-3 |

[1]Steel of the invention.

[2]Steel of the invention having a best combination of properties.

The mechanical properties of the twelve steels of Table V(a), both at 75° F. and at 1000° F., these including the 0.2% yield strength in kilopounds per square inch, the ultimate tensile strength in kilopounds per square inch, the percent elongation in 2" under both conditions of temperature, and the Rockwell hardness at 75° F., are given below in Table V(c).

TABLE V(c)

Mechanical properties of the steels of Table V(a) both at 75°F. and 1,000°F.

| Heat No. | 75°F. 0.2% yield str., K s.i. | 75°F. Ult. tens. str., K s.i. | 75°F. Percent elong. in 2" | 75°F. Rock-well, | 1,000°F. 0.2% yield str., K s.i. | 1,000°F. Ult. tens. str., K s.i. | 1,000°F. Percent elong. in 2" |
|---|---|---|---|---|---|---|---|
| 4639-1[1] | 95.7 | 137.8 | 34 | 25 | 55.1 | 93.8 | 32 |
| 4639-2[2] | 93.3 | 136.5 | 34 | 23 | 50.8 | 94.2 | 32 |
| 4639-3[2] | 91.4 | 135.5 | 35 | 22.5 | 50.5 | 93.5 | 33 |
| 4640-1[1] | 87.6 | 134.3 | 36 | 22.5 | 50.7 | 91.4 | 35 |
| 4640-2[2] | 83.0 | 131.7 | 39 | 20.5 | 47.4 | 89.3 | 34 |
| 4640-3[2] | 76.9 | 128.0 | 40 | 18 | 46.6 | 87.7 | 38 |
| 4641-1[1] | 93.2 | 137.1 | 32 | 25 | 56.2 | 92.8 | 32 |
| 4641-2[2] | 88.6 | 133.2 | 36 | 23 | 49.5 | 92.5 | 28 |
| 4641-3[2] | 85.2 | 133.1 | 35 | 22 | 47.7 | 92.0 | 28 |
| 4642-1[2] | 85.1 | 132.5 | 36 | 21 | 50.0 | 94.4 | 30 |
| 4642-2[2] | 85.2 | 132.0 | 35 | 21 | 50.2 | 95.0 | 32 |
| 4642-3[2] | 86.3 | 133.2 | 35 | 21.5 | 49.2 | 94.3 | 31 |

[1]Steels of invention.
[2]Steels of the invention having a best combination of properties.

A study of the steels of Table V(a) this with respect to structure, resistance to corrosion in the sensitized condition and tensile properties as given in Tables V(b) and V(c) immediately reveals that the chromium-nickel-manganese-molybdenum-nitrogen steels of our invention with chromium from about 23.5% to 24.5%, manganese about 4.5% to 5.5%, molybdenum about 2%, that is, 1.75% to 2.25%, nitrogen about .3% to .4%, carbon not exceeding about .05%, with one or both of the ingredients columbium about .15% to about .25% and vanadium about .15% to about .30% employs something more than 9% nickel to achieve the desired corrosion-resistance in the sensitized condition. In this regard it is noted that the steels having a nickel content of about 9.1% (Heat Nos. 4639–1, 4640–1 and 4641–1) are characterized by Huey rates and ferrite contents in the cold-rolled condition as shown by the magnetic test which may be unacceptable for many applications.

The steels with nickel contents of 10% and above, it will be noted, are characterized by low Huey rates, low ferrite contents, low magnetism in the cold-rolled condition, and high yield strength, both at room temperatures and at elevated temperatures. It is to be particularly noted that it is the steels having a nickel content of some 11.5% to 15.5% which are substantially wholly austenitic (Heat Nos. 4639–3, 4640–3, 4641–3, 4642–1, 4642–2 and 4642–3), the wholly austenitic structure being assured in the three latter steels wherein the nickel ranges from about 13% to 15.5% and wherein there is contained both of the ingredients columbium and vanadium in the amounts noted above. Best strength, however, is had in those steels wherein columbium about .15% to about .25% is present but vanadium is absent and wherein the nickel content is on the low side (Heat No. R4639–1).

A best steel according to our invention, in addition to enjoying a surprising combination of strength, ductility, resistance to corrosion in the sensitized condition, and a substantially fully austenitic structure even after drastic cold-reduction, also is characterized by good resistance to corrosive attack by common acids and salts, such as sulphuric acid, hydrochloric acid and ferric chloride. A comparison between the corrosion-resisting qualities of our steel, of compositions as set out in Table V(a) below, and those of the well-known AISI Type 316, a steel widely used because of its superior corrosion-resisting characteristics, is given below in Table VI(b).

TABLE VI(a)

Chemical composition of six steels according to the invention and of the known Type 316

| Heat No. | C | Mn | Si | Cr | Ni | N | Mo | Cb | V |
|---|---|---|---|---|---|---|---|---|---|
| R6766 | .033 | 5.22 | .30 | 23.16 | 12.29 | .31 | 2.84 | — | — |
| R6767 | .036 | 5.15 | .32 | 23.10 | 12.22 | .31 | 2.84 | .29 | — |
| R6971 | .056 | 5.36 | .42 | 23.77 | 13.68 | .31 | 1.98 | .21 | .20 |
| R6972 | .058 | 5.30 | .43 | 23.84 | 13.65 | .33 | 2.20 | .23 | .21 |
| R6973 | .050 | 5.46 | .41 | 23.35 | 13.72 | .33 | 2.42 | .21 | .21 |
| R6974 | .055 | 5.14 | .43 | 23.90 | 13.57 | .32 | 2.63 | .24 | .20 |
| Type 316 44328 | .054 | 1.74 | .72 | 17.51 | 13.09 | — | 2.82 | — | — |

NOTE: All heats phosphorus .020% max., sulphur .015% max.

The percent ferrite content of the steels of the invention and that of Type 316 reported in Table VI(a) above, as well as the attack by a 10% ferric chloride solution as measured in grams per square inch for a 50-hour exposure, the attack as measured in inches per year by a hot 5% sulphuric acid solution by a hot 1% hydrochloric acid solution, each as an average of five 48-hour periods, are given below in Table VI(b).

TABLE VI(b)

Ferrite content and general corrosion-resisting properties of the steels of Table VI(a)

| Heat No. | Percent ferrite | 10% $FeCl_3$ 50 hr. gm./in.$^2$ | 5% $H_2SO_4$ 80°C. IPY[1] | 1% HCl 80°C IPY[1] |
|---|---|---|---|---|
| R6766 | 1.5 | 0 | 0 | 0 |
| R6767 | 5 | 0 | 0 | 0 |
| R6971 | 0 | 0 | 0 | 0 |
| R6972 | 0 | 0 | 0 | 0 |
| R6973 | 0 | 0 | 0 | 0 |
| R6974 | 0 | 0 | 0 | 0 |

TABLE VI(b)-continued

Ferrite content and general corrosion-resisting properties of the steels of Table VI(a)

| Heat No. | Percent ferrite | 10% $FeCl_3$ 50 hr. gm./in.$^2$ | 5% $H_2SO_4$ 80°C. IPY[1] | 1% HCl 80°C IPY[1] |
|---|---|---|---|---|
| Type 316 44328 | 0 | .0099 | 0–.0470 | 0–.2980 |

[1]Average of five 48-hr. periods.
NOTE:
Specimens are electrolytically activated for the 3rd, 4th and 5th periods. Where specimens exhibited both active and passive conditions, both rates are shown.

It will be seen from the results reported in Table VI(b) above that while the steel of Type 316 suffers a loss of .0099 gram per square inch after 50 hours in a 10% ferric chloride solution, our steel is immune to such attack. And while the Steel of Type 316 for an average of five 48-hour periods in a hot 5% sulphuric acid solution (80° C.) suffers a loss of .0470 inch per year and in a hot 1% solution of hydrochloric acid (80° C.) an attack at the rate of .2980 inch per year, the steel of our invention is immune to both, suffering no measurable attack. Also, it will be noted that while two of the steels of our invention (Heat Nos. R6766 and R6767) contain a small amount of ferrite, the best steels with a somewhat higher nickel content are free of ferrite, as is the steel of Type 316.

A best steel according to our invention, with good general corrosion characteristics as noted above, essentially consists of about 23% to about 24% chromium, about 12% to about 14% nickel (more especially about 13% to about 14% nickel), about 4.5% to about 5.5% manganese, about .2% to about .4% nitrogen, about 1.7% to about 2.9% molybdenum (more especially 1.75% to 2.75% molybdenum), about .1% to about .4% columbium (more especially about .2% to about .3% columbium), with or without about .1% to about .4% vanadium (especially about .1% to about .3% vanadium included), carbon not exceeding .67%, and remainder substantially iron.

Thus, in conclusion, it will be seen that we provide in our invention an austenitic chromium-nickel-manganese-nitrogen stainless steel with one or more, and for a best combination of properties, two or more of the additional ingredients molybdenum, columbium and vanadium. In this steel there are had the various objects hereinbefore set forth, together with many and new and unforeseen advantages. The steel of our invention enjoying a best combination of properties is fully austenitic under all conditions and, moreover, is resistant to intergranular attack in the sensitized condition, that is, in an as-welded condition. Moreover, the steel enjoying the best combination of properties is possessed of good tensile strength and good yield strength, both at room temperatures and at elevated temperatures as well.

Our steel in the form of flat-rolled products or, indeed, in the form of drawn, forged or cast products, lends itself to a variety of forming, shaping and machining operations as well as brazing, welding, and the like, in the production of a variety of products destined for use in the aerospace, the chemical and the petroleum industries. In the aircraft industry our steel is particularly suited to the production of ducting and tubing operating at elevated temperatures, that is, temperatures approaching 1000° F., the ducting and tubing being utilized either in the annealed condition or in the cold-drawn condition. It is particularly suited for pneumatic and structural ducts. Our steel also is suited to use in the form of clamps and bellows. Moreover, it is suited to the production of tankage for defoliation chemicals, as well as tankage, tubing, bellows and the like in various cryogenic applications.

In short, our steel is eminently suited to the many varying applications where standard austenitic stainless steels are used but where additional strength and/or less weight are found desirable, for our steel enjoys a rather high ratio of strength to weight. And, as noted above, the steel is characterized by resistance to intercrystalline corrosion in the sensitized condition, that is, in the condition following a welding operation, as well as good general corrosion-resistance under the conditions encountered in use.

Inasmuch as there are many embodiments which may be made of our invention, and since there are many variations which may be made in the embodiments set out above, it will be understood that all matter described herein is to be interpreted as illustrative and not by way of limitation.

We claim as our invention:

[1. Alloy steel of improved resistance to intergranular corrosion having a tensile strength exceeding some 100,000 p.s.i. at room temperature together with an elongation in 2" of at least about 30% and essentially consisting of about 20.5% to about 25% chromium, about 6% to about 17% nickel, about 3.5% to about 7% manganese, about .15% to about .50% nitrogen, at least two ingredients selected from the group consisting of molybdenum, columbium and vanadium wherein molybdenum is about .5% to about 4%, columbium about .1% to about .7% and vanadium about .05% to about .5%, with carbon less than .08%, silicon not exceeding about .7% and remainder substantially all iron.]

[2. Alloy steel of improved resistance to intergranular corrosion having a tensile strength exceeding some 100,000 p.s.i. at room temperatures together with an elongation in 2" of at least about 30% and essentially consisting of chromium about 21% to about 25%, nickel about 7.5% to about 16%, manganese about 4% to less than 6%, nitrogen about .20% to about .40%, at least two ingredients selected from the group consisting of molybdenum, columbium and vanadium wherein molybdenum is about 1% to about 3%, columbium about .2% to about .4% and vanadium about .1% to about .5%, with carbon not exceeding .03%, silicon up to about .4%, and remainder substantially all iron.]

[3. Alloy steel of improved resistance to intergranular corrosion having a tensile strength of at least about 125,000 p.s.i. with an elongation in 2" of at least about 30% and essentially consisting of about 22.5% to about 24.5% chromium, about 7.5% to about 15.5% nickel, about 4.5% to about 5.5% manganese, about .3% to about .4% nitrogen, about .5% to less than 3% molybdenum, at least one of the ingredients selected from the group consisting of columbium and vanadium wherein columbium is about .1% to about .5% and vanadium about .1% to about .5%, carbon not exceeding about .06%, silicon less than .5%, and remainder substantially all iron.]

4. Alloy steel of improved corrosion-resistance together with strength and ductility and essentially consisting of about 23% to about 25% chromium, about 9.5% to about 15.5% nickel, about 4% to less than 6% manganese, about .20% to about .40% nitrogen, about 1.5% to about 2.5% molybdenum, about .2% to about .4% columbium, about .1% to about .5% vanadium, about .03% to about .06% carbon, about .25% to about .4% silicon, and remainder substantially all iron.

[5. Alloy steel of improved resistance to intergranular corrosion having a tensile strength exceeding some 100,000 p.s.i. at room temperatures together with an elongation in 2" of at least about 30% and essentially consisting of about 20.5% to about 25% chromium, about 11% to about 13% nickel, about 4.5% to about 5.5% manganese, about .20% to about .40% nitrogen, about 1.5% to about 2.5% molybdenum, at least one of the ingredients selected from the group consisting of columbium and vanadium wherein columbium is about .20% to about .40% and vanadium about .05% to about .40%, carbon not exceeding about .05%, and remainder substantially all iron.]

[6. Alloy steel of improved resistance to intergranular corrosion having a tensile strength exceeding some 100,000 p.s.i. at room temperatures together with an elongation in 2" of at least about 30% and essentially consisting of about 23% to about 25% chromium, about 11.5% to about 15.5% nickel, about 4.5% to about 5.5% manganese, about .30% to about .40% nitrogen, about 1.5% to about 2.5% molybdenum, at least one of the ingredients selected from the group consisting of columbium and vanadium wherein columbium is about .15% to about .30% and vanadium about .10% to about .50%, with carbon not exceeding about .05%, and remainder substantially all iron.]

[7. Alloy steel of improved corrosion-resistance together with strength and ductility and essentially consisting of about 23.5% to about 24.5% chromium, about 13% to about 15.5% nickel, about 4.5% to about 5.5% manganese, about .30% to about .40% nitrogen, about 1.75% to about 2.25% molybdenum, about .15% to about .30% columbium, about .10% to about .30% vanadium, with carbon not exceeding about .06%, and remainder substantially all iron.]

[8. Alloy steel of improved corrosion-resistance together with strength and ductility and essentially consisting of about 23% to about 24% chromium, about 9.5% to about 10.5% nickel, about 4.5% to about 5.5% manganese, about .30% to about .40% nitrogen, about 1.75% to about 2.25% molybdenum, about .15% to about .25% columbium, about .15% to about .25% vanadium, carbon not exceeding about .06%, and remainder substantially all iron.]

[9. Alloy steel of improved corrosion-resistance together with strength and ductility and essentially consisting of about 21% to about 24% chromium, about 11% to about 13% nickel, about 4.5% to about 5.5% manganese, about .25% to about .4% nitrogen, about 2% to about 3% molybdenum, columbium about .1% to about .4%, carbon not exceeding about .05%, silicon not exceeding about .4%, and remainder substantially all iron.]

[10. Alloy steel of improved corrosion-resistance together with strength and ductility and essentially consisting of about 23% to about 24% chromium, about 15% to about 16% nickel, about 4.5% to about 5.5% manganese, about .3% to about .4% nitrogen, about 2.5% to about 3% molybdenum, columbium about .1% to about .5%, about .025% to about .035% carbon, and remainder substantially all iron.]

[11. Alloy steel of improved resistance to intergranular corrosion having a tensile strength exceeding some 100,000 p.s.i. at room temperatures together with an elongation in 2" of at least about 30% and essentially consisting of about 20.5% to about 22% chromium, about 6% to about 9% nickel, about 3.5% to less than 6% manganese, about .25% to about .4% nitrogen, with at least two of the ingredients selected from the group consisting of molybdenum, columbium and vanadium wherein molybdenum is about 1.5% to about 2.5%, columbium about .2% to about .4% and vanadium about .1% to about .5%, carbon not exceeding about .06%, and remainder substantially all iron.]

[12. Alloy steel of improved resistance to intergranular corrosion having a tensile strength of at least about 125,000 p.s.i. with an elongation in 2" of at least about 30% and essentially consisting of about 23.5% to about 24.5% chromium, about 9.5% to about 15.5% nickel, about 4.5% to about 5.5% manganese, about .3% to about .4% nitrogen, about 1.5% to about 2.5% molybdenum, at least one of the ingredients selected from the group consisting of columbium and vanadium wherein columbium is about .1% to about .3% and vanadium about .2% to about .4%, carbon not exceeding about .06%, and remainder substantially all iron.]

[13. Alloy steel of improved resistance to intergranular corrosion having a tensile strength of at least about 125,000 p.s.i. with an elongation in 2" of at least about 30% and essentially consisting of about 23.5% to about 24.5% chromium, about 10% to about 12% nickel, about 4.5% to about 5.5% manganese, about .3% to about .4% nitrogen, about 1.75% to about 2.25% molybdenum, at least one of the ingredients selected from the group consisting of columbium and vanadium wherein columbium is about .15% to about .25% and vanadium about .15% to about .30%, carbon not exceeding about .05%, and remainder substantially all iron.]

[14. Alloy steel of improved corrosion-resistance together with strength and ductility and essentially consisting of about 21.5% to about 24% chromium, about 7% to about 8% nickel, about 4.5% to about 5.5% manganese, about .2% to about .4% nitrogen, about .5% to about 1.5% molybdenum, about .2% to about .4% columbium, about .1% to about .4% vanadium, carbon not exceeding about 0.6%, and remainder substantially all iron.]

[15. Alloy steel of improved corrosion-resistance together with strength and ductility and essentially consisting of about 22% to about 24% chromium, about 9% to about 10% nickel, about 4.5% to about 5.5% manganese, about .2% to about .4% nitrogen, about 1% to about 2% molybdenum, about .2% to about .4% columbium, about .1% to about .4% vanadium, carbon not exceeding about .05%, and remainder substantially all iron.]

[16. Alloy steel of improved corrosion-resistance together with strength and ductility and essentially consisting of about 23% to about 24% chromium, about 12% to about 14% nickel, about 4.5% to about 5.5% manganese, about .2% to about .4% nitrogen, about 1.7% to about 2.9% molybdenum, about .1% to about .4% columbium, with or without about .1% to about .4% vanadium, carbon not exceeding about .06%, and remainder substantially all iron.]

[17. Alloy steel of improved corrosion-resistance together with strength and ductility and essentially consisting of about 23% to about 24% chromium, about 13% to about 14% nickel, about 4.5% to about 5.5% manganese, about .2% to about .4% nitrogen, about 1.75% to about 2.75% molybdenum, about .2% to about .3% columbium, about .1% to about .3% vanadium, with carbon not exceeding about .06%, and remainder substantially all iron. ]

*18. Substantially austenitic alloy steel of improved resistance to intercrystalline corrosion in the welded condition, said steel having a tensile strength exceeding some 100,000 p.s.i. at room temperature together with an elongation in 2" of at least about 30% and essentially consisting of about 20.5% to 25% chromium, about 6% to about 17% nickel, about 3.5% to about 7% manganese, about 0.15% to about 0.50% nitrogen, about 0.5% to about 4% molybdenum, about 0.05% to about 0.5% vanadium, with carbon about 0.03% to 0.06%, silicon not exceeding about 0.7% and remainder substantially all iron.*

*19. Alloy steel according to claim 18, essentially consisting of about 20.5% to 25% chromium, about 6% to about 17% nickel, about 3.5% to about 7% manganese, about 0.15% to about 0.50% nitrogen, about 0.5% to about 4% molybdenum, about 0.1% to about 0.7% columbium, about 0.05% to about 0.5% vanadium, with carbon about 0.03% to 0.06%, silicon not exceeding about 0.7% and remainder substantially all iron.*

* * * * *